United States Patent
Hedley et al.

(10) Patent No.: US 9,295,021 B2
(45) Date of Patent: Mar. 22, 2016

(54) MEASUREMENT OF TIME OF ARRIVAL

(75) Inventors: Mark Hedley, St Leonards (AU); David Humphrey, Carlingford (AU)

(73) Assignee: COMMONWEALTH SCIENTIFIC AND INDUSTRIAL RESEARCH ORGANISATION, Campbell (AU)

(*) Notice: Subject to any disclaimer, the term of this patent is extended or adjusted under 35 U.S.C. 154(b) by 461 days.

(21) Appl. No.: 12/736,939

(22) PCT Filed: May 25, 2009

(86) PCT No.: PCT/AU2009/000647
§ 371 (c)(1),
(2), (4) Date: Feb. 10, 2011

(87) PCT Pub. No.: WO2009/143559
PCT Pub. Date: Dec. 3, 2009

(65) Prior Publication Data
US 2011/0286505 A1   Nov. 24, 2011

(30) Foreign Application Priority Data
May 26, 2008   (AU) ................. 2008902624

(51) Int. Cl.
*H04B 1/7163*   (2011.01)
*H04W 64/00*   (2009.01)
*G01S 5/02*   (2010.01)

(52) U.S. Cl.
CPC ............. *H04W 64/00* (2013.01); *G01S 5/0205* (2013.01); *G01S 5/0221* (2013.01)

(58) Field of Classification Search
CPC .......................... H04B 1/71637; H04B 1/7176
USPC ....................................................... 375/239
See application file for complete search history.

(56) References Cited

U.S. PATENT DOCUMENTS

| 4,799,062 A | 1/1989 | Sanderford, Jr. et al. |
| 5,056,106 A | 10/1991 | Wang et al. |

(Continued)

FOREIGN PATENT DOCUMENTS

| GB | 1351185 | 4/1974 |
| JP | H6-217304 | 8/1994 |

(Continued)

OTHER PUBLICATIONS

International Search Report for PCT/AU2009/000647, mailed Jul. 14, 2009.

(Continued)

*Primary Examiner* — Kevin Kim
(74) *Attorney, Agent, or Firm* — Nixon & Vanderhye P.C.

(57) ABSTRACT

Disclosed is a method of measuring time of arrival of a signal transmitted from a transmitter (120) to a receiver (110-n). The method comprises: modulating a plurality of narrowband signal portions onto different carrier frequencies; transmitting, by the transmitter, each modulated signal portion to the receiver; receiving, by the receiver, the transmitted signal portions; estimating the channel impulse response by combining (610) the received signal portions; and measuring (620) the time of arrival using the estimated channel impulse response. Further disclosed is a method of measuring a time of arrival of a signal transmitted from a transmitter to a receiver. The method comprises: estimating a noise level (1310) in an impulse response of a channel between the transmitter and the receiver; finding a first peak (1330) in the channel impulse response that is not noise or a side lobe of a subsequent peak, using the estimated noise level; and measuring the time of arrival (1220) using the first peak.

20 Claims, 14 Drawing Sheets

(56) References Cited

U.S. PATENT DOCUMENTS

| | | | |
|---|---|---|---|
| 5,438,321 A | 8/1995 | Bernard et al. | |
| 5,513,854 A | 5/1996 | Daver et al. | |
| 5,583,517 A | 12/1996 | Yokev et al. | |
| 5,764,686 A | 6/1998 | Sanderford et al. | |
| 5,805,108 A | 9/1998 | Lennen | |
| 5,822,362 A | 10/1998 | Friedmann | |
| 5,859,613 A | 1/1999 | Otto | |
| 6,054,950 A | 4/2000 | Fontana | |
| 6,169,497 B1 | 1/2001 | Robert | |
| 6,204,813 B1 | 3/2001 | Wadell et al. | |
| 6,259,894 B1 | 7/2001 | Tekinay | |
| 6,275,705 B1 | 8/2001 | Drane et al. | |
| 6,414,634 B1 | 7/2002 | Tekinay | |
| 6,469,665 B2 | 10/2002 | Porcino | |
| 6,483,461 B1 | 11/2002 | Matheney et al. | |
| 6,504,483 B1 | 1/2003 | Richards et al. | |
| 6,665,333 B2 | 12/2003 | McCrady et al. | |
| 6,675,018 B2 | 1/2004 | Villier et al. | |
| 6,687,507 B2 | 2/2004 | Fischer et al. | |
| 6,795,491 B2 | 9/2004 | Fleming et al. | |
| 6,804,494 B2 | 10/2004 | Fernandez-Corbaton et al. | |
| 6,831,603 B2 | 12/2004 | Menache | |
| 6,882,315 B2 | 4/2005 | Richley et al. | |
| 6,968,194 B2 | 11/2005 | Aljadeff et al. | |
| 7,009,561 B2 | 3/2006 | Menache et al. | |
| 7,026,992 B1 | 4/2006 | Hunt et al. | |
| 7,030,814 B2 | 4/2006 | Stone et al. | |
| 7,095,813 B2 | 8/2006 | Amerga et al. | |
| 7,295,159 B1 | 11/2007 | Belcea et al. | |
| 7,308,022 B2 | 12/2007 | Rick et al. | |
| 7,317,933 B2 | 1/2008 | Rached et al. | |
| 7,489,904 B2* | 2/2009 | Belcea | 455/67.11 |
| 7,602,334 B1* | 10/2009 | Lorenz | 342/357.29 |
| 7,962,162 B2* | 6/2011 | McNair | 455/503 |
| 2001/0030625 A1 | 10/2001 | Doles et al. | |
| 2001/0051526 A1 | 12/2001 | Ruutu et al. | |
| 2002/0167444 A1 | 11/2002 | Lee | |
| 2002/0196184 A1 | 12/2002 | Johnson et al. | |
| 2003/0092448 A1 | 5/2003 | Forstrom et al. | |
| 2003/0114164 A1 | 6/2003 | Thomas et al. | |
| 2003/0216142 A1 | 11/2003 | Wigren | |
| 2004/0063441 A1 | 4/2004 | Diao et al. | |
| 2004/0196782 A1 | 10/2004 | Pan et al. | |
| 2005/0013345 A1* | 1/2005 | Choi | 375/130 |
| 2005/0124368 A1 | 6/2005 | Diao et al. | |
| 2005/0282568 A1 | 12/2005 | Keerthi | |
| 2005/0286409 A1 | 12/2005 | Yoon et al. | |
| 2006/0066485 A1 | 3/2006 | Min | |
| 2006/0187119 A1 | 8/2006 | Hall et al. | |
| 2007/0002728 A1* | 1/2007 | Fujii et al. | 370/210 |
| 2007/0075899 A1 | 4/2007 | Inaba | |
| 2007/0115842 A1 | 5/2007 | Matsuda et al. | |
| 2007/0201309 A1 | 8/2007 | Brown et al. | |

FOREIGN PATENT DOCUMENTS

| | | |
|---|---|---|
| JP | 2005/070019 | 3/2005 |
| WO | WO 98/37932 | 9/1998 |
| WO | WO 99/53339 | 10/1999 |
| WO | WO 01/66201 | 9/2001 |
| WO | WO 01/84874 | 11/2001 |
| WO | WO 02/087261 | 10/2002 |
| WO | WO 2004/040327 | 5/2004 |
| WO | WO 2004/044606 | 5/2004 |

OTHER PUBLICATIONS

International Preliminary Report on Patentability, completed Oct. 21, 2010.

Yiu-Tong Chan et al., "Time-of-Arrival Based Localization Under NLOS Conditions", IEEE Transactions on vehicular technology Jan. 2006, pp. 17-24.

Z. Jane Wang et al., "A MIMO-OFDM Channel Estimation Approach Using Time of Arrivals", IEEE Transactions on Wireless Communications, May 2005, pp. 1207-1213.

H.C. So et al., "A Generalized Subspace Approach for Mobile Positioning with TOA Measurements", IEEE transactions on Signal Processing Oct. 2007, pp. 5103-5107.

Nadir Castaneda et al., "Source Localization from quantized TOA measurements", ICASSP 2006, pp. IV-933-936.

M. Rydestrom, et al., "Robust Sensor Network Positioning Based on Projections Onto Circular and Hyperbolic Convex Sets (POCS)", IEEE 7th International Workshop on Signal processing advances in wireless communications 2006, 5 pages.

R. Wu et al., "Super Resolution Time Delay Estimation via MODE-WRELAX", IEEE Transactions on Aerospace and Electronic Systems, vol. 35, No. 1, Jan. 1999, pp. 294-307.

J. Li et al., "An Efficient Algorithm for Time Delay Estimation", IEEE Transactions on Signal Processing, vol. 46, No. 8, Aug. 1998, pp. 2231-2235.

Chin-Der Wann et al., "Hybrid TOA/RSSI Wireless Location with Unconstrained Nonlinear Optimization for Indoor UWB channels", WCNC 2007, pp. 3943-3948.

T, Moon, "The Expectation Maximization Algorithm", IEEE Signal Processing Magazine, Nov. 1996, pp. 47-60.

P. J. Voltz et al., "Maximum Likelihood Time of Arrival Estimation for Real-Time Physical Location Tracking of 802.11a/g Mobile Stations in Indoor Environments", PLANS 2004, pp. 585-591.

S. A. Sattarzadeh et al., "TOA Extraction in Multipath Fading Channels for Location Estimation", IEEE International Symposium on Personal, Indoor and Mobile Radio Communications (PIMRC'06), 4 pages.

Y. Qi et al., "On Time-of-arrival Positioning in a Multipath Environment", IEEE Transactions on Vehicular Technology, vol. 55, No. 5, Sep. 2006, pp. 1516-1526.

S. Al-Jazzar et al., "ML and Bayesian TOA Location Estimators for NLOS Environments", IEEE Transactions on Vehicular Technology Conference 2002 (VTC), pp. 1178-1181.

D. McCrady et al., "Mobile Ranging with Low Accuracy Clocks", IEEE Transactions on Microwave theory and Techniques, Jun. 2000, pp. 85-88.

S. Srirangarajan et al., "Localization in Wireless Sensor Networks under Non line-of-sight Propagation", IEEE Globecom 2005, pp. 3477-3481.

Zhao, Fang, et al., "Super-resolution TOA Estimation in OFDM Systems for Indoor Environments", Proceedings of the 2007 IEEE International Conference on Networking, Sensing and Control, London, UK, Apr. 15-17, 2007, pp. 723-728.

Humphrey, David, et al., "Super-Resolution Time of Arrival for Indoor Localization", IEEE International Conference on Communications, Beijing, CN, May 19-23, 2008, pp. 3286-3290.

Alsindi, Nayef, "Analysis of Time of Arrival Estimation Using Wideband Measurements of Indoor Radio Propagations", IEEE Transactions on Instrumentation and Measurement, IEEE Service Center, Piscataway, New Jersey, US, vol. 56, No. 5, Oct. 1, 2007, pp. 1537-1545.

Szumny, Rafal, et al., "Antenna Diversity Impact to Indoor Wireless TOA-based Positioning Systems Accuracy", Radio and Wireless Symposium, IEEE, Piscataway, New Jersey, Jan. 22, 2008, pp. 295-298.

Extended European Search Report dated Mar. 11, 2015 issued in European Application No. 09753323.6 (8 pages).

* cited by examiner

MEASUREMENT OF TIME OF ARRIVAL

This application is the U.S. national phase of International Application No. PCT/AU2009/000647 filed 25 May 2009 which designated the U.S. and claims priority to AU Patent Application No. 2008902624 filed 26 May 2008, the entire contents of each of which are hereby incorporated by reference.

FIELD OF THE INVENTION

The present invention relates generally to device localisation and tracking and, in particular, to locating or tracking devices using radio signals based on measurement of the time of arrival (TOA) of a signal.

BACKGROUND

Wireless radio localisation is an area of technology that uses radio signals to determine the location of a device. The scope of this technology is very wide, varying from short range (a few meters) to very long ranges associated with the navigation of aircraft. In recent times the best known system is the US-originated Global Positioning System (GPS), which provides accuracy of the order of a few meters (or better) anywhere on the surface of the Earth, provided line-of-sight propagation exists to the associated satellites. However, indoor localisation or localisation in an urban environment is much less developed, mainly due to the difficult radio propagation conditions. One of the most common technologies is to use receiver signal strength. This can be used to estimate range, and hence perform localisation by multilateration; however, this gives very poor results in indoor environments. A better approach is to survey the signal strength at locations of interest and perform matching to determine location. This requires updating the survey whenever changes in the physical environment affect the radio propagation, and even with this updating, high accuracy is rarely achieved. Greater accuracy is achieved by measuring the time of arrival (TOA) (or in some cases the phase) of a radio signal. Such systems effectively estimate the time a "pulse" of radio energy is detected in the radio receiver. The accuracy of this determination depends upon many factors, the most important of which include the signal bandwidth, the signal-to-noise ratio (SNR), and the signal-to-interference (multipath) ratio. As a wideband system can result in the generation of a narrow pulse in the radio receiver, the accuracy of the system is essentially proportional to the signal bandwidth. In indoor and other environments with multipath signals, the received signal is a complex mixture of multiple scattered signals. As the scattered and reflected signals are delayed relative to the direct path, the accuracy of the measurement of the TOA reduces to the order of these delays. However, if the signal bandwidth is sufficient to resolve each of the signals, then the TOA measurement can be based on the arrival of the first significant signal without any corruption from the other scattered signals. Even where individual signals cannot be resolved, increasing the bandwidth still improves the accuracy of the TOA measurement. Accurate localisation in a multipath environment therefore favours wide bandwidth signals for TOA measurement. The problem with wide bandwidth is that it requires the use of complicated, power hungry, and relatively expensive radio transmitters and receivers.

One wideband technology for providing accurate TOA measurement is called Ultra-Wideband (UWB). UWB occupies a bandwidth from 3.1 GHz to 10.6 GHz; however, current government regulations severely limit the RF power radiated in this spectrum in order to avoid interference with other radio systems. The range of such systems is thus limited to about 10 meters. Such systems require a large number of base stations to cover a typical indoor area, so that installations can be expensive and logistically difficult. Such systems also require expensive radios to generate and receive the UWB signals.

In the case that the direct radio signal is not corrupted by unresolved reflections, peak detection is the optimum method for measurement of TOA. However, this lack of corruption is not usually the case, and other methods have been proposed for the measurement of TOA. These may be classed into two broad groups:

Methods based on analysis of the channel impulse response. An estimate of the channel impulse response can be determined by correlating the received signal against the transmitted signal or by taking the inverse Fourier transform of the channel frequency response. The TOA may be measured from the channel impulse response by a number of different schemes including: peak detection, leading edge detection based on thresholding, adaptive thresholding, and schemes based on an analysis of the slope of the leading edge.

Super-resolution schemes based on direct analysis of the channel frequency response. These methods attempt to find a small set of multipath delays and amplitudes that match the observed channel frequency response. Such schemes are extremely intensive computationally, typically requiring the calculation of eigenvalues and eigenvectors of large matrices. Furthermore, the improvement obtained over the time domain methods is marginal. The fundamental problem is that, in dense multipath environments, the channel frequency response contains insufficient information to reconstruct the set of arrival times. As a result, there are a number of possible solutions which match the observed data equally well, but give different estimates for the TOA.

SUMMARY

It is an object of the present invention to substantially overcome, or at least reduce, one or more disadvantages of existing arrangements.

Disclosed are arrangements using at least one of two aspects: estimating the channel response using multiple narrowband signal portions, which lowers hardware cost, and techniques for the measurement of the time of arrival using the channel impulse response.

Accordingly, there is disclosed a method of measuring time of arrival of a signal transmitted from a transmitter to a receiver. The method comprises: modulating a plurality of narrowband signal portions onto different carrier frequencies; transmitting, by the transmitter, each modulated signal portion to the receiver; receiving, by the receiver, the transmitted signal portions; estimating the channel impulse response by combining the received signal portions; and measuring the time of arrival using the estimated channel impulse response.

There is further disclosed a method of measuring a time of arrival of a signal transmitted from a transmitter to a receiver. The method comprises: estimating a noise level in an impulse response of a channel between the transmitter and the receiver; finding a first peak in the channel impulse response that is not noise or a side lobe of a subsequent peak, using the estimated noise level; and measuring the time of arrival using the first peak.

Improving the accuracy of TOA measurements not only permits more accurate localisation and tracking, but can also be used for more accurate time synchronisation between devices.

BRIEF DESCRIPTION OF THE DRAWINGS

One or more embodiments of the invention will now be described with reference to the drawings, in which.

DETAILED DESCRIPTION

Figure 1:
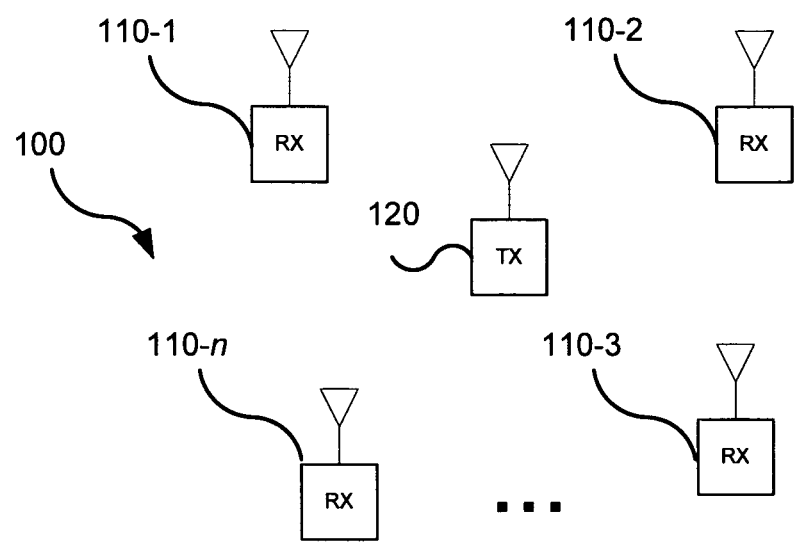
FIG. 1 is a high level diagram of a device localisation and tracking system.

Where reference is made in any one or more of the accompanying drawings to steps and/or features which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

Overview

According to one aspect of the present disclosure, a signal for use in measuring TOA is generated by generating a plurality of signal portions, and transmitting the signal portions separately. If the signal portions were combined and transmitted as a single signal, the combined signal would require a bandwidth for transmission that is wide relative to the bandwidths of each signal portion.

This arrangement has the advantage that only relatively narrow bandwidths are required for transmitting each signal portion, but once a received signal is synthesised by combining the received signal portions, a TOA measurement can be made, with accuracy equivalent to a system using the relatively wideband signal. Transmission of narrow bandwidth signals enables the use of relatively inexpensive radio transmitters. For example, in one embodiment, single-chip radios which are available for other applications may be utilised. For example, radios which are utilised in Local Area Networks (LANs) may be used. Another advantage of this arrangement is that, because transmission of each signal portion occurs over a relatively narrow band, current spectral usage regulations permit substantially higher transmit power compared to UWB. Therefore, TOA may be measured over much greater distances, and far fewer base stations are required. Radio transmission requirements are defined by regulating authorities, in particular the Federal Communications Commission (FCC) in the United States. In one embodiment, in order to comply with regulatory requirements, the signal portions are generated and transmitted in the 2.4 GHz and/or the 5.8 GHz bands. In this embodiment, signal modulation for transmission is by a combination of direct-sequence and frequency hopping spread spectrum techniques, which is allowable under the FCC regulations.

In one embodiment, the relatively wide bandwidth is the full bandwidth of the ISM band at 2.4 GHz (83.5 MHz bandwidth) or 5.8 GHz (125 MHz bandwidth), and the relatively narrow bandwidth is that used by the IEEE 802.11 Standard systems (about 20 MHz or 40 MHz depending upon the version of the Standard). The relatively narrow bandwidth allows low cost and highly integrated chip radios to service the 802.11 product market. However, the disclosed arrangement is equally applicable to other frequency bands and to any signal bandwidth where the desired system bandwidth exceeds instantaneous bandwidth.

Still in accordance with the first aspect, a wideband impulse response is formed from received signal portions that were generated and transmitted. The wideband impulse response obtained by combining the plurality of received signal portions is an estimate of the channel impulse response that would be produced using a wideband transmitted signal. This aspect comprises the steps of determining a frequency response for each of the received signal portions, applying a correction to the phase and, in some instances, also the amplitude of the frequency responses or the received signal portions, then determining the wideband channel impulse response. The time according to a clock local to the receiver is retained for each of the samples of the signal portions. In practice, as the sample rate is known, only the time of a single sample is required.

The signal portions when received are not synchronised in phase. Phase offsets arise between the received signal portions, amongst other reasons, because phase coherency is lost when the oscillators in the transmitter and receiver are retuned for the different carrier frequency of each signal portion. These phase offsets are corrected so that the wideband frequency response has a continuous phase to obtain a high resolution impulse response. Likewise, the amplitude response of the transmitter and receiver apparatus may vary for different carrier frequencies. If this is the case, correcting the relative amplitude of the signal portions is also desirable. Disclosed are three approaches to correction of the phase and amplitude of each signal portion. In one approach, one or more reference signals are provided and transmitted with the signal portions, the reference signals facilitating phase alignment of the signal portions. In another approach, the signal portions provide a non-overlapping coverage of the wideband spectrum, and phase and amplitude correction occurs at the edges of the frequency response of the signal portions. In a third approach, the signal portions provide an overlapping coverage of the wideband spectrum, and phase and amplitude correction occurs in the overlap regions of the signal portions.

According to a second aspect of the present disclosure, the TOA is measured from the wideband impulse response obtained in accordance with the first aspect of the disclosure or any other method for obtaining a channel impulse response. The TOA is the time according to a clock local to the receiver at which the signal generated and transmitted in accordance with the first aspect of the disclosure is first received. This is usually determined to a higher temporal accuracy than the data sample period. In one embodiment, the received data is digitised at a rate of 25 MHz (40 ns sample period), the wideband impulse response is determined with a 5 ns sample period, and the TOA is measured with a resolution of 0.1 ns. The task of measuring the TOA is achieved by determining the peak in the impulse response associated with the signal that traveled directly from the transmitter to the receiver. In many environments, there will be many scattered signals received (multipath interference), and the direct path signal may not be the strongest signal, and it may even be concealed by noise or side lobes of a stronger delayed signal entering the receiver. It is also possible for multiple scattered signals to be received sufficiently close in time that they are difficult to resolve.

The present inventors have determined that where multipath interference is present, most of the information about the TOA is contained in a few samples grouped about the leading edge of the first peak in the channel impulse response. Hence, it is most appropriate to use the leading edge to determine when the signal is first received. There are two approaches to this determination. The first approach takes into account the noise and possible side lobes. However, as the data is usually severely underdetermined in that there are more signal components than measurements, it is not possible to resolve all the reflected signals from the data, affecting the accuracy of the TOA measurement. The second approach uses statistical information derived from measurements of channel response and true range in similar propagation environments to improve the TOA measurement accuracy.

GLOSSARY OF SYMBOLS

In what follows, the following symbols are used:

b Index for each signal portion. This will range from 0 to B−1, where B is the total number of signal portions.

$x_b[n]$ Transmitted signal portion indexed by b.

$X_b[k]$ The Fourier transform of the transmitted signal portion $x_b[n]$.

$y_b[n]$ The received signal portion indexed by b.

$Y_b[k]$ The Fourier transform of the received signal portion $y_b[n]$.

$\overline{\omega}_b$ The centre or carrier frequency of the transmission in the signal portion indexed by b.

$\omega_N$ The bandwidth of each narrowband transmission (i.e. each signal portion).

Note that the signals listed above are each baseband signals, i.e. complex-valued (quadrature) signals with carrier removed (in time domain) or centred around ω=0 (in frequency domain). These signals are therefore not the actual transmitted or received signals at the respective antennae.

System Description

FIG. 1 is a high level diagram of a device localisation and tracking system 100. FIG. 1 shows a single mobile transmitter (TX) 120 and several fixed receivers (RX), e.g. 110-n, as nodes in the system 100. If the clocks in all nodes were synchronised, and all propagation delays in system components known, then by knowing the transmit time of a signal transmitted by TX 120 and by measuring the time that the same signal is received by each of the plurality of RXs 110-n, then the range from TX 120 to each of the plurality of RXs 110-n can be determined, hence the location of TX 120 determined. If the transmit time of TX 120 is not known, then the location can still be determined by using a time difference of arrival (TDOA) algorithm. If the TX and RX nodes 120 and 110-n are not synchronised in time, a round trip delay can be measured by having in each node a transceiver device capable of transmitting a signal and measuring a received TOA. In what follows, arrangements for the measurement of TOA using a single transmitter and a single receiver will be described. The described arrangements can be generalised to the case of a plurality of transmitters and a plurality of receivers, and the case where a device functions as a transmitter only, a receiver only, or both.

Figure 2:
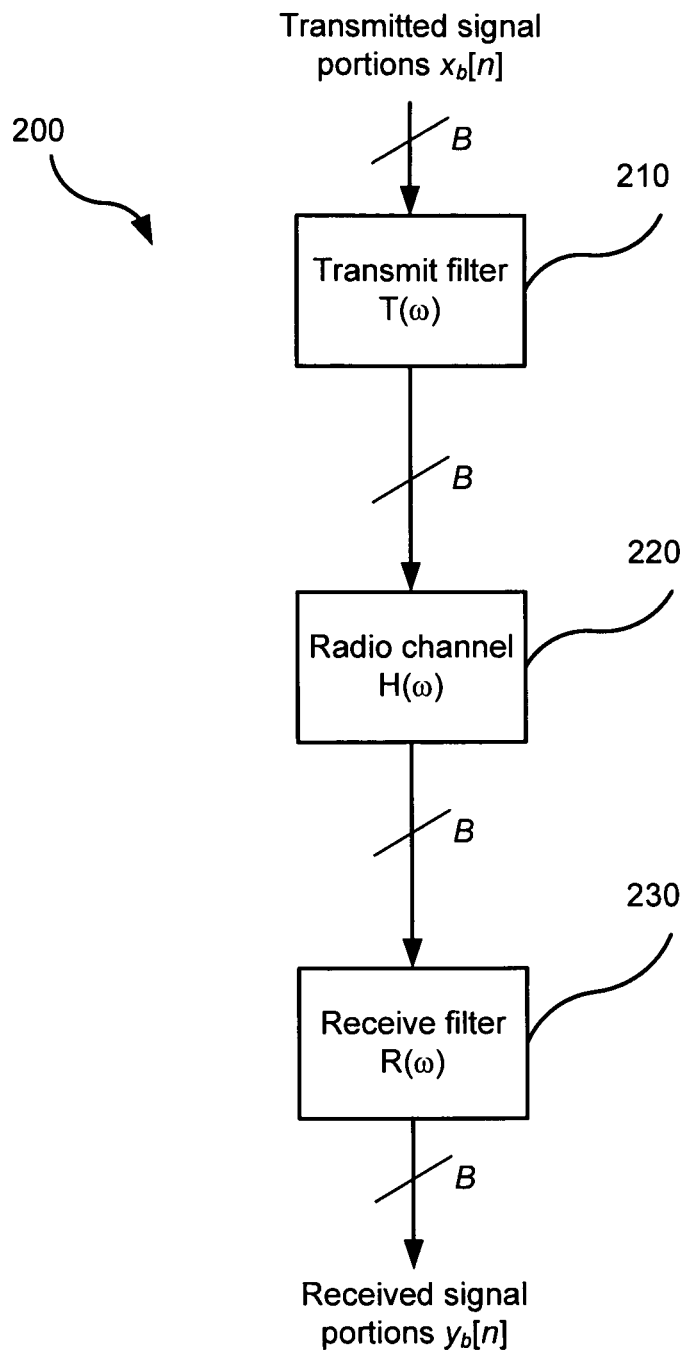
FIG. 2 is high level diagram of the signal flow in the tracking system of FIG. 1.

FIG. 2 is high level diagram of the signal flow 200 in the tracking system 100 of FIG. 1. B digital, time sampled signal portions $x_b[n]$ are sent via a transmitter (e.g the transmitter 120) over a radio communications channel 220 to a receiver (e.g the receiver 110-n), which together transform the transmitted signal portions $x_b[n]$ into the received signal portions $y_b[n]$. In one exemplary implementation (Example 1), the signals can have a sampling rate of 25 MHz, and can be transmitted with quadrature modulation with a digitally limited maximum bandwidth of 18.75 MHz. The transmitter 120 converts the transmit signal portions $x_b[n]$ to analog form and modulates each signal portion onto the corresponding transmission centre frequency $\overline{\omega}_b$. The transmitted signal portions are unavoidably distorted by the electronic circuits in the transmitter 120, whose distortive effect is modelled as a transmit filter 210 with a frequency response T(ω), by the radio communications channel 220, which has a frequency response H(ω), and by the electronic circuits in the receiver, whose distortive effect is modelled as a receive filter 230 with a frequency response R(ω). At the receiver 110-n, the received signal portions are converted to baseband and then converted to digital samples $y_b[n]$. H(ω), R(ω), and $y_b[n]$ are in general different for different receivers using the same transmitted signal $x_b[n]$.

In Example 1, B=8 signal portions $x_b[n]$ are used in the 5.8 GHz ISM band, with transmission centre frequencies (in MHz) of $$\overline{\omega}_b = 5734.375 + b*15.234 \tag{1}$$

so that the 8 signal portions $x_b[n]$ (each with a bandwidth $\omega_N$, of 18.75 MHz) cover a frequency range of 125 MHz, from 5725 MHz to 5850 MHz. Other implementations can use other frequency bands, bandwidths, and numbers of, and extents of overlap of, signal portions.

At the receiver 110-n, the received signal portions $y_b[n]$ are combined in the frequency domain to form an estimate of the channel frequency response H(ω), compensating for the effects of the transmitter and receiver frequency response (T(ω) and R(ω) respectively). This compensation may occur before or after the estimation of the channel frequency response. The wideband channel impulse response h[n] is then obtained by applying the inverse Fourier transform to the estimate of the channel frequency response H(ω). The TOA of the signal is then measured from the leading edge of the channel impulse response h[n].

In an alternative arrangement, the receiver 110-n correlates the received signal portions $y_b[n]$ with the respective transmitted signal portions $x_b[n]$ to produce B narrowband "correlograms". The narrowband correlograms may combined to form either an estimate of the channel frequency response H(ω), or a wideband correlogram c[n] that in turn can either be treated as an estimate of the channel impulse response h[n], or processed to form an estimate of the channel impulse response h[n].

Transmitter

Figure 3:
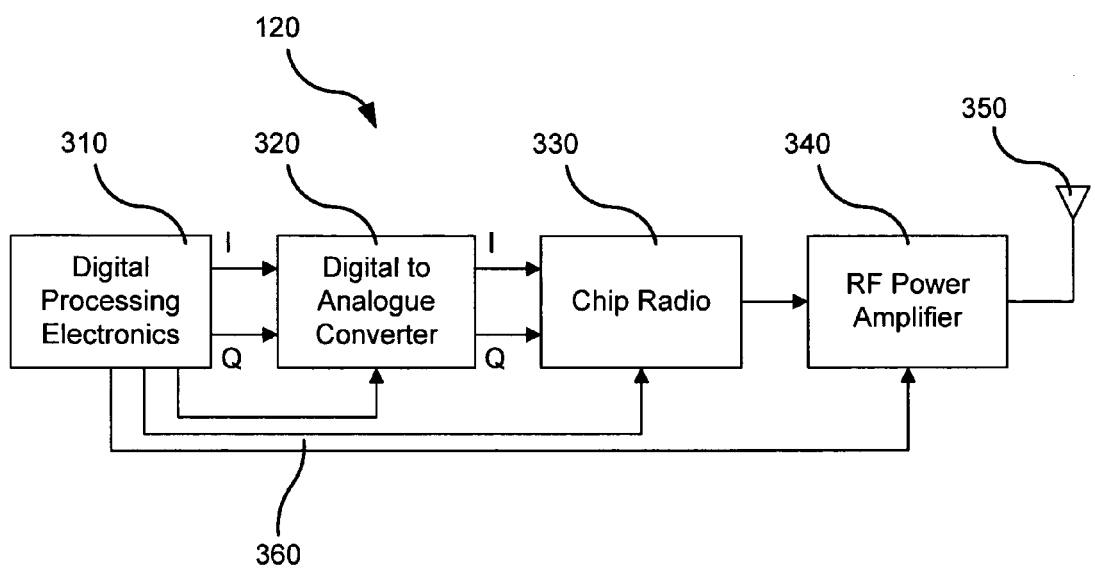
FIG. 3 is a block diagram of the transmitter of FIG. 1.

FIG. 3 is a block diagram of the transmitter 120 of FIG. 1. Digital processing electronics device 310 generates the transmitted signal portions $x_b[n]$ and controls the operation of the other circuit components 320, 330, and 340. The digital processing device 310 may be any type of digital signal processing device including a central processing unit (CPU), microcontroller, digital signal processor (DSP), field programmable gate array (FPGA) or application specific integrated circuit (ASIC). The digital signal portions $x_b[n]$ are preferably generated in the baseband and preferably include in-phase signal (I) and quadrature signal (Q) components. Alternatively, the signal portions $x_b[n]$ are generated as a modulated signal on a relatively low intermediate frequency carrier. In one implementation, the digital baseband signals $x_b[n]$ for each of the signal portions b=0, . . . , B−1 are identical. This simplifies the processing at a receiver 110-$n$, but is not a necessary condition.

Each transmitted signal portion $x_b[n]$ preferably has (1) substantially equal power at all the frequencies within the band of the signal portion, and (2) a limited peak to average power ratio in the time domain, as is known in the context of channel sounding (e.g. the 802.11 OFDM long training sequence). If a pseudo-noise (PN) sequence is used for each transmitted signal portion $x_b[n]$, the amplitude of frequency components near the edge of the band may be small, adversely affecting the phase alignment (described below) of the received signal portions $y_b[n]$ at the receiver 120. In one implementation, the baseband signal portions $x_b[n]$ are generated by starting with a complex multilevel Gaussian noise signal and iteratively modifying the signal in the time and frequency domains. At each iteration in the time domain large samples are reduced in order to reduce the peak to average power ratio. At each iteration in the frequency domain, frequencies with small amplitude are amplified. In one implementation, 100 iterations are sufficient.

In one implementation, successive signal portions $x_b[n]$ can overlap in the frequency domain, as in Equation (1). In another implementation, the signal portions $x_b[n]$ can cover the wide band without overlap. In yet another implementation, the signal portions $x_b[n]$ can contain pilot signals. The pilot signals are added after the procedure described in the previous paragraph to limit peak to average power ratio and to equalize the frequency domain amplitudes. The pilot signals are more powerful frequency components at specific frequencies that are used to reconstruct the wideband frequency response. In particular, it is desirable to have higher power at the two band edges for the narrowband signal $x_b[n]$.

The digital to analog converter (DAC) 320 converts the digital signal portions $x_b[n]$ to analog signals. The chip radio 330 modulates each analog signal to the corresponding carrier frequency; then a power amplifier 340 increases the radio signal power prior to transmission through the transmit antenna 350. The digital processing device 310 establishes the sample rate of the DAC 320, the carrier frequencies for the chip radio 330, and the transmit power for the power amplifier 340 by control signals 360. The transmitter 120 preferably contains a temperature compensated crystal oscillator (TCXO) that is stable to within 1 ppm. Other stable frequency sources could be used including an oven controlled crystal oscillator or a signal locked to the GPS system.

Figure 4:
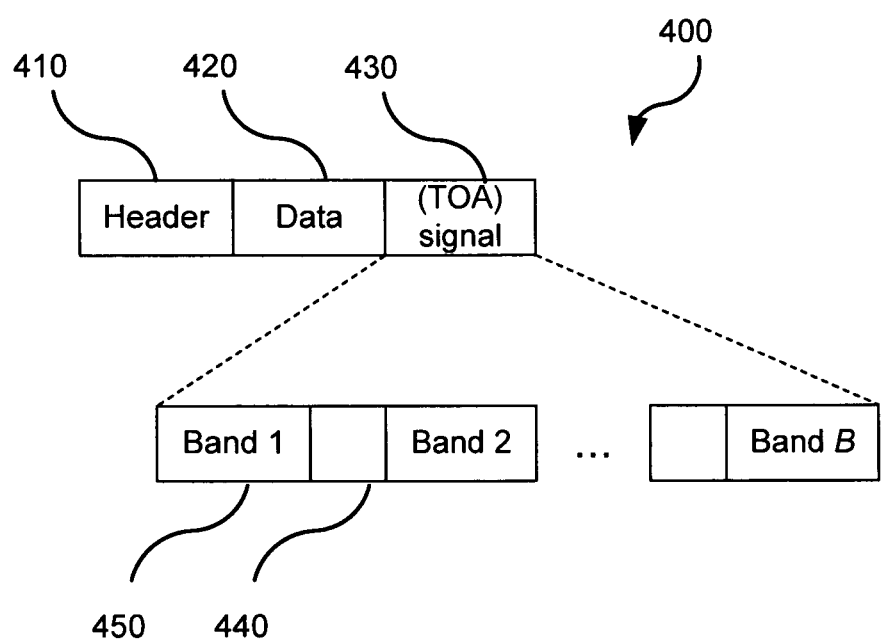
FIG. 4 illustrates the signal that is transmitted by the transmitter of FIG. 3.

FIG. 4 illustrates a signal packet 400 that is transmitted by the transmitter 120 of FIG. 3. The signal packet 400 has a header 410 that includes a synchronisation symbol to assist the receiver to detect the start of the transmission. The header 410 also contains data about the packet 400, such as identifying the transmitter and whether it contains a data payload. The packet 400 also has an optional data payload 420, followed by a signal 430 used for TOA measurement. The TOA signal 430 consists of a plurality of signal portions, e.g. 450, each modulated to a different carrier frequency. Between each of the signal portions is a time gap, e.g. 440, providing time for the transmitter 120 to electronically alter the carrier frequency in preparation for modulating the next signal portion. In one implementation, each signal portion 450 has a length of 1024 samples (i.e. 40.96 µs), and the gap 440 between signal portions is 20.48 µs.

Receiver

Figure 5:
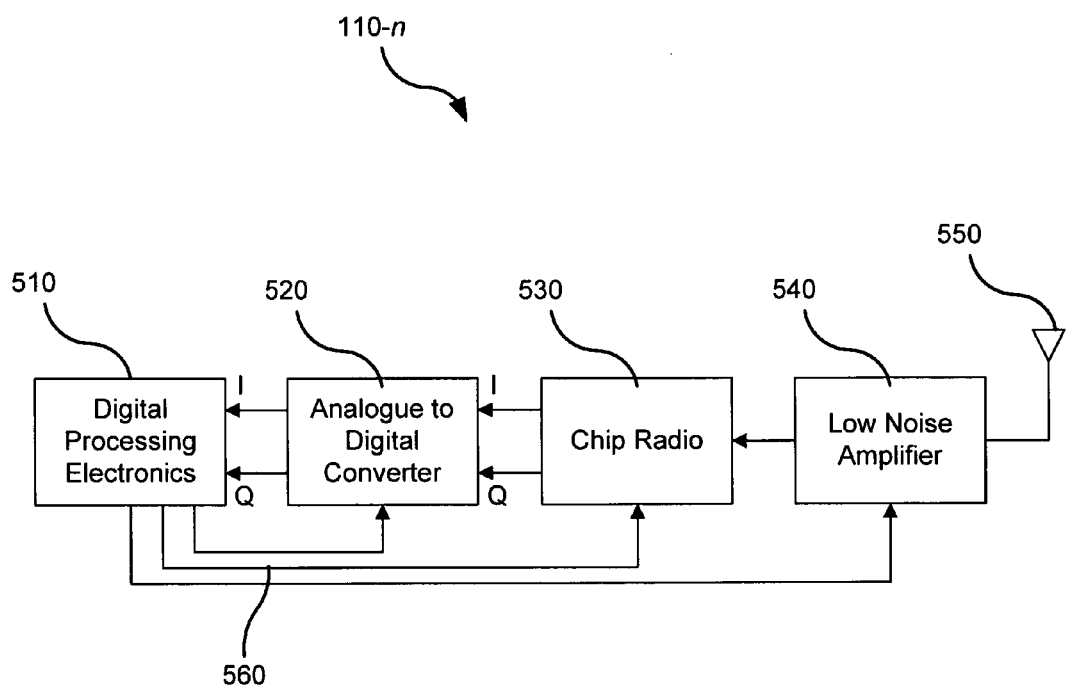
FIG. 5 is a block diagram of the receiver of FIG. 1.

FIG. 5 is a block diagram of a receiver 110-$n$ of FIG. 1. The signal is received by an antenna 550, then amplified by a low noise amplifier 540 (which can be part of the chip radio 530). A chip radio 530 performs receiver tasks including filtering, variable gain amplification, and mixing to baseband. The resultant complex baseband signal comprises an in-phase signal (I) and a quadrature signal (Q). These IQ signals are digitised by an analog to digital converter (ADC) 520, which sends the digital I and Q signals to a digital processing electronics device 510 to produce a TOA measurement. The TOA measurement can be used internally or sent via an external interface to further apparatus (not shown).

The digital processing electronics device 510 may be any type of digital processing device including a central processing unit (CPU), microcontroller, digital signal processor (DSP), field programmable gate array (FPGA) or application specific integrated circuit (ASIC). The digital processing electronics device 510 establishes the sample rate of the ADC 520, the carrier frequencies of the chip radio 530, and the gain (automatic gain control to keep the signal to the ADC 520 within acceptable levels) of the amplifier 540 by control signals 560. The receiver 110-$n$ contains a temperature compensated crystal oscillator (TCXO) that is stable to within 1 ppm. Other stable frequency sources could be used including an oven controlled crystal oscillator or a signal locked to the GPS system. Digitisation does not necessarily occur on a baseband signal, and may occur on an intermediate frequency (IF) signal.

The functionality illustrated in FIG. 5 could be split, such that a radio receiver sends analog or digital data to a separate apparatus that performs some or all of the functions of the digital processing electronics device 510. In one implementation, a plurality of receivers 110-$n$ can send signals to a single such apparatus that records and processes the signals as described above.

In one implementation, the digital processing electronics device 510 continually processes the digital samples output from the ADC 520 to identify the header 410 associated with the start of a transmission. When the header 410 is identified, the digital baseband received signal portions $y_b[n]$ (in the expected locations with respect to the header 410 according to the structure of the transmitted signal 400) are recorded for subsequent processing, along with the local clock time of one of the samples.

In the case where the same device serves both as transmitter 120 and receiver 110-$n$, the digital electronics device 310 and the chip radio 330 would also be used by the receiver in place of the device 510 and the chip radio 530, and an RF switch (not shown), controlled by the digital signal processing device 310, would switch the antenna 350 between the RF power amplifier 340 for use as a transmitter and the low noise amplifier 540 for use as a receiver.

Receiver Processing

Figure 6:
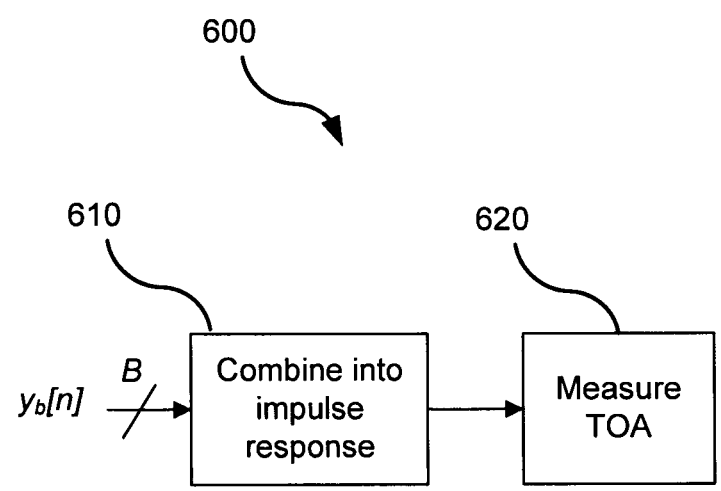
FIG. 6 is a flow diagram illustrating a method of measuring the TOA as carried out by the receiver of FIG. 5.

FIG. 6 is a flow diagram illustrating a method 600 of measuring the TOA as carried out by the receiver 110-n of FIG. 5. Note that while various processing steps are described herein as occurring in a particular domain (time or frequency), processing can equivalently take place in the conjugate domain, bearing in mind that the transform between the domains is the Fourier, or inverse Fourier, transform. The first step 610 of the method 600 combines the B received signal portions $y_b[n]$ into an estimate of the wideband channel impulse response h[n], as described in detail below with reference to FIG. 7. The second step 620 uses the estimated channel impulse response h[n] to measure the TOA, as described in detail below with reference to FIG. 12. The measurement of the TOA is independent of the method used for estimation of the channel impulse response h[n], and hence any method for estimation of the channel impulse response h[n] can be used to provide input for step 620.

Figure 7:
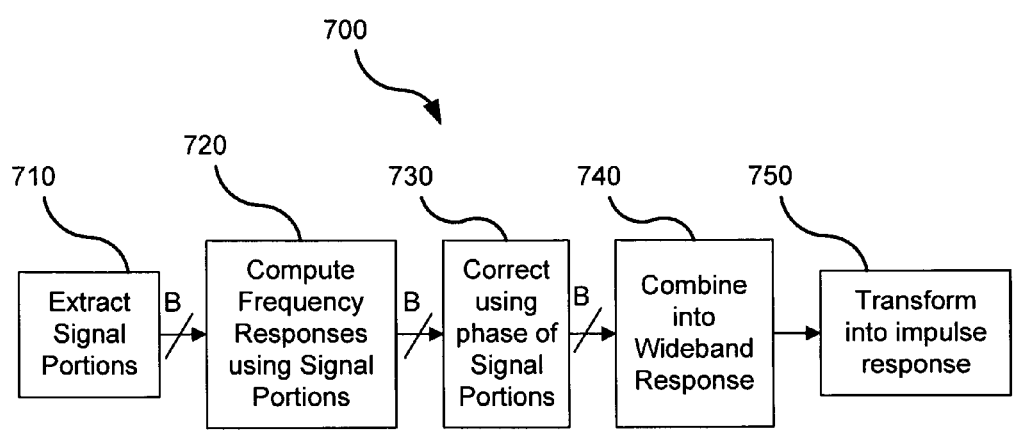
FIG. 7 is a flow diagram illustrating a method of calculating the channel response, as used in the method of FIG. 6.

FIG. 7 is a flow diagram illustrating a method 700 of calculating the channel impulse response h[n], as used in step 610 of the method of FIG. 6. The samples $y_b[n]$ associated with each of the received signal portions are extracted from the received signal as described above in step 710, then a frequency response is determined from each of the signal portions $y_b[n]$ in step 720 as described in detail below with reference to FIG. 8. A phase offset for each of the signal portions is then determined and applied in step 730 as a correction to the frequency responses, so that when the corrected frequency responses are combined into a wideband frequency response in step 740, the phase component is continuous. In the final step 750, the wideband frequency response is transformed into an impulse response. The relationship between the wideband channel frequency response and the wideband impulse response is an inverse Fourier transform, where windowing may be applied to the frequency response to limit the side lobes of the impulse response (as side lobes of a main peak may be confused with peaks from a separate reflected signal in the impulse response).

In one implementation, the transmission header 410 contains a synchronisation symbol (or sequence) that allows the start of the transmission to be identified to within a time resolution of a few samples. Such techniques are known to those working with physical layer communication protocols. By having a known offset (in samples) to the start of each signal portion, the samples associated with each received signal portion can be extracted in step 710. While there may be a temporal error of a few samples, this has no significant effect on the TOA measurement, as the same offset will apply to all signal portions. There may also be a frequency offset between the transmitter and receiver. In one implementation, this offset is limited to a maximum of 2 ppm, the signals are sampled at 25 MHz, and the duration of the TOA signal is approximately 0.5 ms. The maximum sample offset between the first and last signal portion is therefore 0.5 ms×2 ppm×25 MHz=0.025 samples. Hence no sample offset correction between the signal portions needs to be applied to compensate for frequency offsets, and this small offset is automatically compensated for by adjusting the signal phase between signal portions.

Step 720 estimates the channel frequency response within each band b, using the following equation to compensate for the transmit and receive filters $T(\omega)$ 210 and $R(\omega)$ 230 of FIG. 2:

$$H'_b(\overline{\omega}_b + \omega) = \frac{Y_b(\omega)}{T(\overline{\omega}_b + \omega)R(\overline{\omega}_b + \omega)X_b(\omega)} \quad (2)$$

where $H_b'(\overline{\omega}_b+\omega)$ is an estimate of the portion of the wideband channel frequency response $H(\omega)$ within the band indexed by b. In equation (2), ω runs over the bandwidth of frequencies in a baseband signal portion, namely $[-\omega_N/2, \omega_N/2]$. In Example 1 discussed above, ω runs from −12.5 MHz to 12.5 MHz, and $\overline{\omega}_b$ is as given in equation (1).

Figure 8:
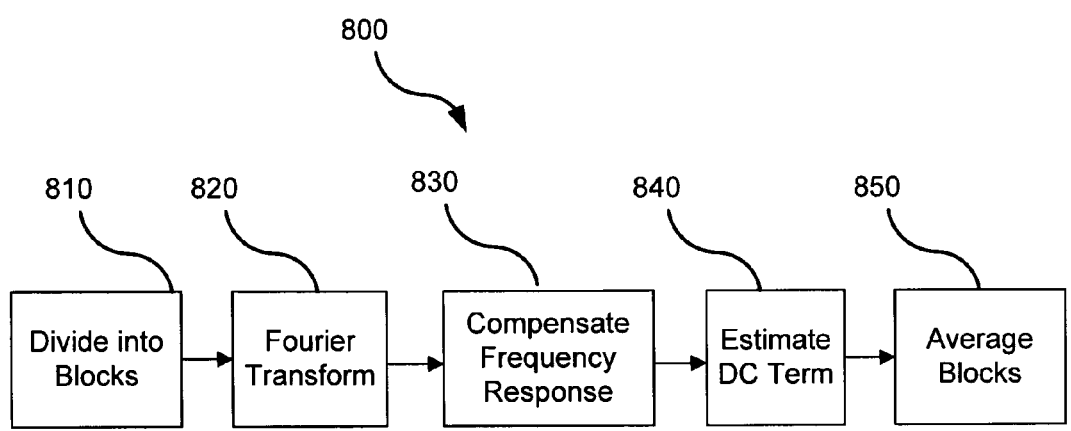
FIG. 8 is a flow diagram illustrating a method of calculating each portion of the frequency response of the channel, as used in the method of FIG. 7.

FIG. 8 is a flow diagram illustrating a method 800 of estimating the frequency response of each received signal portion as used in step 720 of FIG. 7. The benefit of the method 800 over numerous other possible methods is that it is efficient from a computational point of view.

In the method 800, each received signal portion $y_b[n]$ consists of 1024 samples which are divided in step 810 into 16 blocks of 64 samples. As mentioned above, each 64 sample block of the transmitted signal is preferably a noise-like sequence with approximately equal power at each frequency obtained by a 64-point fast Fourier transform (FFT) of the block. The peak to average power ratio of the block in the time domain is also preferably limited. In step 820 the 64-point FFT of each of the 16 64-sample blocks is calculated. In step 830, to recover the frequency response $H_b'(\omega)$ of the channel within the frequency band indexed by b (as in the frequency response approach), each point in each block is multiplied by a complex factor that compensates for the combined effects of the transmit and receive filters, and divided by the corresponding value of the FFT of the transmitted signal block, as in Equation (2). These operations can be combined into a single complex multiplication by a constant for each point in each block. Since there is no baseband DC component transmitted through the radio communication channel 220, the corresponding point in the received frequency response or the channel frequency response is estimated in step 840 by averaging the known points on either side (i.e. the missing value is linearly interpolated). Each of the 16 blocks now contains a 64 point representation of the channel properties. The blocks are averaged together in step 850 to obtain the 64 sample estimate of channel frequency response $H_b'(\omega)$ for the band indexed by b. The method 800 is carried out for each of the B received signal portions.

The method 800 can also be applied to signal portions with different numbers of samples and to different block sizes. The reduction in the number of samples reduces the process gain, while the number of samples within a block determines the maximum delay spread which will not result in aliasing. In the preferred embodiment maximum possible delay spread for the received signal that will not result in aliasing is 1024 (samples)×40 ns (sample period)/16 (sample reduction factor)=2560 ns (corresponding to a range differential between the shortest path and the longest path of 768 m assuming propagation at the speed of light).

In step 720 according to the correlogram arrangement mentioned above, the received signal portions are compensated for the transmit and receive filters $T(\omega)$ 210 and $R(\omega)$ 230 before correlation with the transmitted signal portions to yield B estimates $H_b'(\overline{\omega}_b+\omega)$ of portions of the channel frequency response.

Having obtained (in step 720) the set of B narrowband responses, $H_b'(\omega)$, with $\omega$ running from $$\overline{\omega}_b - \frac{\omega_N}{2} \text{ to } \overline{\omega}_b + \frac{\omega_N}{2}$$

for each b, the step 740 combines these signals together into a single wideband frequency response $H'(\omega)$, with $\omega$ running from $$\left(\overline{\omega}_b - \frac{\omega_N}{2}\right)\Big|_{b=0} \text{ to } \left(\overline{\omega}_b + \frac{\omega_N}{2}\right)\Big|_{b=B-1}.$$

One approach to combining the response estimates is to take the measured samples from each signal portion and assign them to the appropriate place in the wideband estimate, i.e.

$$H'(\omega) = \begin{cases} H_0'(\omega), & \overline{\omega}_0 - \frac{\omega_N}{2} < \omega < \overline{\omega}_0 + \frac{\omega_N}{2} \\ H_1'(\omega), & \overline{\omega}_1 - \frac{\omega_N}{2} < \omega < \overline{\omega}_1 + \frac{\omega_N}{2} \\ \quad \ldots \\ H_{B-1}'(\omega), & \overline{\omega}_{B-1} - \frac{\omega_N}{2} < \omega < \overline{\omega}_{B-1} + \frac{\omega_N}{2} \end{cases} \quad (3)$$

However, in a practical system, changing the frequency of the transmitting and receiving radios creates an unknown offset in the phase and possibly also the amplitude of the response estimates $H_b'(\omega)$. As a result, the wideband estimate (3) will have arbitrary jumps in the phase at the boundaries between the signal portion estimates, and may also have jumps in the amplitude. These phase and amplitude jumps result in large errors in the channel impulse response. To overcome this problem, a set of correction factors $c_b = \alpha_b e^{j\theta_b}$ are applied in step 730, so that the wideband frequency response is given by $$H'(\omega) = \begin{cases} H_0'(\omega), & \overline{\omega}_0 - \frac{\omega_N}{2} < \omega < \overline{\omega}_0 + \frac{\omega_N}{2} \\ a_1 e^{j\theta_1} H_1'(\omega), & \overline{\omega}_1 - \frac{\omega_N}{2} < \omega < \overline{\omega}_1 + \frac{\omega_N}{2} \\ \quad \ldots \\ a_{B-1} e^{j\theta_{B-1}} H_{B-1}'(\omega), & \overline{\omega}_{B-1} - \frac{\omega_N}{2} < \omega < \overline{\omega}_{B-1} + \frac{\omega_N}{2} \end{cases} \quad (4)$$

In order to eliminate the phase jumps, the correction factors $c_b$ can be computed as $$c_b = \left[ \frac{H_b'\left(\overline{\omega}_b - \frac{\omega_N}{2}\right)}{H_{b-1}'\left(\overline{\omega}_{b-1} + \frac{\omega_N}{2}\right)} \right] \quad (5)$$

which assumes that the lowest frequency in band b corresponds to the highest frequency in band b−1. In some implementations the correction factors $c_b$ may be normalised to have a complex amplitude of 1, so that the correction is for the phase only. Equation (5) uses the phase and amplitude at signal portion band edges. The direct application of equation (5) is however generally unsatisfactory, because the measurement of the phase and amplitude at one particular frequency has little or no process gain and as a result will usually be very noisy. The following describes several alternatives to the direct application of equation (5) in step 730.

Approach 1—Use of Pilot Signals

In this approach, the signal power in the transmitted signals is boosted at the band edges in order to give a higher signal to noise ratio for the channel measurement at these frequencies. With this modification to the transmitted signals, equation (5) can be applied directly. Boosting the transmitted signal power at the band edges comes at the expense of reducing the power transmitted at other frequencies, affecting the accuracy of the channel estimate at the remaining frequencies. There may also be regulatory issues with the regular transmission of high power pilot signals.

Approach 2—Averaging of the Phase Near the Band Edge

The function $H'(\omega)$ varies smoothly with frequency. Thus, provided the frequency spacing of the samples of the function $H_b'(\omega)$ is sufficiently small, the estimate at any given point can be improved by low pass filtering. This improved estimate of the band edge of the signal portion can be used in equation (5) to obtain an improved estimate of the correction factors $c_b$. Low pass filtering can give a significant improvement if the sample rate of the estimates $H_b'(\omega)$ is higher than necessary to represent the function. Oversampling $H_b'(\omega)$ in this way is wasteful of computational resources.

Approach 3—Overlapping of the Signal Portion Estimates

This approach to the estimation of the parameters correction factors $c_b$ is to overlap the signal portions. The signal portion spacing is selected such that some number of samples k at the top of signal portion b are at the same frequencies as the k samples at the bottom of signal portion b+1. The phase correction factor is then chosen to provide the best match over this set of k samples. The least squares solution to the problem of finding the correction factors $c_b$ in equation (4) is given by $$c_b = \frac{\sum_{\omega_p \in \Omega} H_{b-1}'^*(\omega_p) H_b'(\omega_p)}{\sum_{\omega_p \in \Omega} H_b'^*(\omega_p) H_b'(\omega_p)} \quad (6)$$

where $\Omega$ is the set of k overlapping frequencies, and $H'^*$ is the complex conjugate of $H'$. In the overlapping region there are now two measurements for $H'$. These are averaged to give the final value in the corrected wideband estimate.

The processing in the first two steps 710 and 720 of method 700, using the parameters mentioned above, results in 64 samples in the frequency domain for each of eight signal portions. The processing in the remaining steps 730 to 750 of the method 700 is now described. Starting with signal portions 0 and 1, Equation (6) is applied to determine the correction $c_1$ that is applied to signal portion 1, then this is repeated for subsequent pairs of signal portions until the correction $c_{B-1}$, has been applied to the final (B−1) signal portion. Because of the overlap in frequency response of the signal portions (Equation (1)), the final frequency response has a bandwidth of 125 MHz and contains 321 complex samples. This is the wideband frequency response $H'(\omega)$.

To obtain the channel impulse response h[n] (step 750), the wideband frequency response $H'(\omega)$ is extended to 512 samples by padding with zeros, a Blackman window is applied, then an inverse FFT converts the data to the time domain, yielding the impulse response h[n]. The temporal spacing between the output samples is 5 ns.

Measuring the TOA

The final step in processing the received signal to measure the TOA is step 620 in method 600, and this will now be described. Although all subsequent references are to the impulse response h[n], exactly the same steps may be applied to the correlogram c[n], the latter being an approximation to the impulse response h[n] as mentioned above.

Before the methods described below are utilised, the step 620 takes the absolute value of the estimated impulse response h[n].

Figure 9:
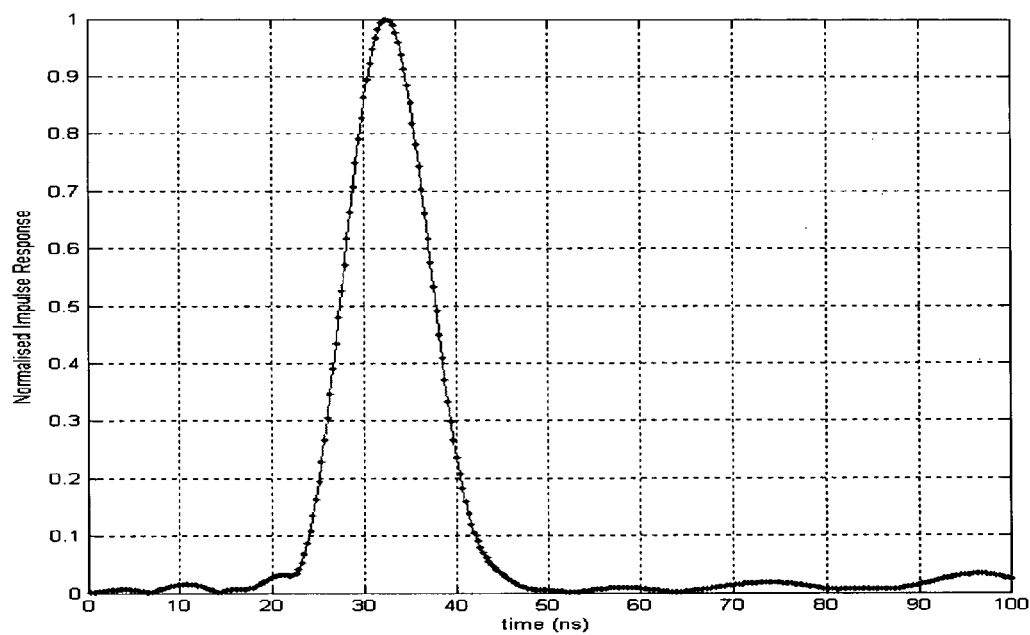
FIG. 9 is an illustration of a sample channel impulse response in an environment where no multipath signals are apparent.

FIG. 9 is an illustration of an exemplary channel impulse response in an environment where no multipath signals are apparent. For this data, a sixteen times interpolation has been performed. The width of the main lobe of the impulse response is approximately the reciprocal of the bandwidth times two. In the preferred embodiment this is 2/125 MHz=16 ns. For non-multipath impulse responses such as the one in FIG. 9, the best estimate of the TOA is to determine the time associated with the peak of the impulse response.

Figure 10:
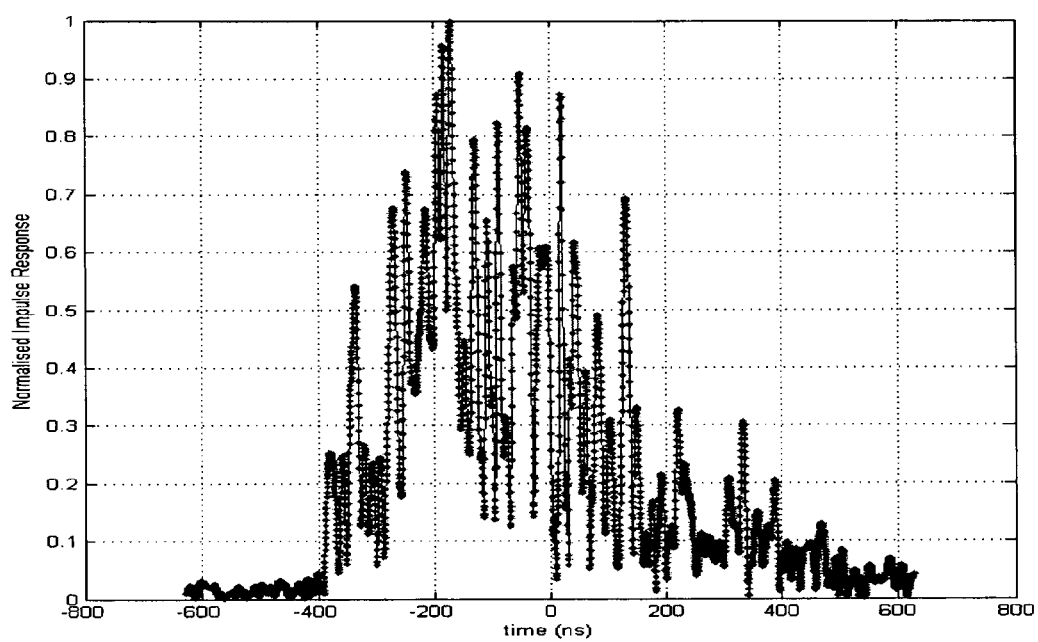
FIG. 10 is an illustration of a sample channel impulse response in a multipath environment.
Figure 11:
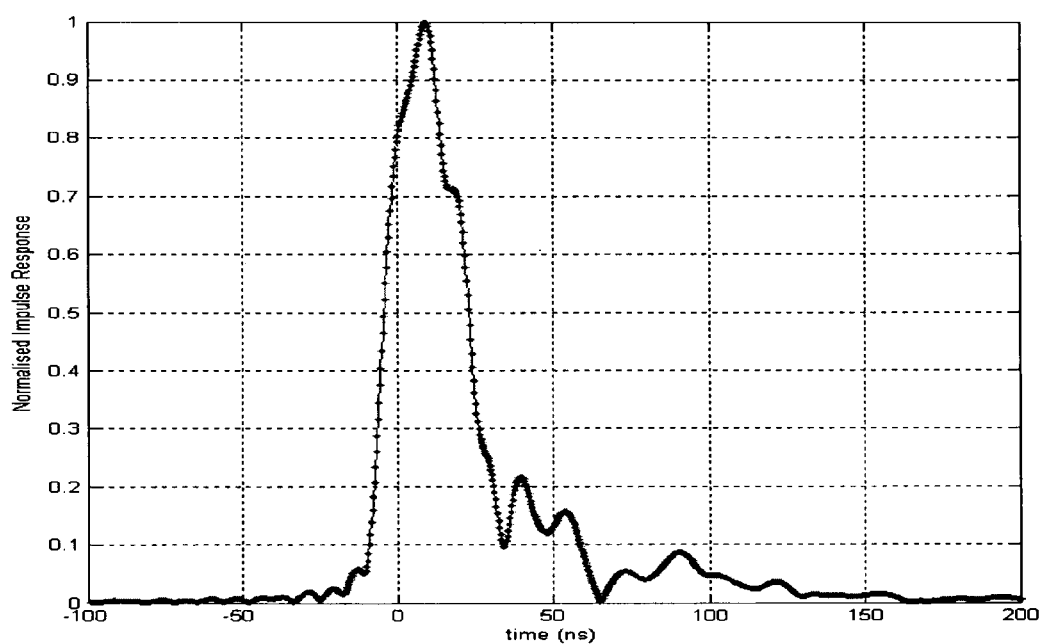
FIG. 11 is an illustration of a sample channel impulse response containing two unresolved signals.

Consider now the exemplary impulse response illustrated in FIG. 10. This is obtained in an indoor environment and shows characteristics which a robust TOA measurement method should be able to handle. It is evident that multiple reflections of the transmission are received (multipath interference), which provides multiple peaks in the impulse response spread over a period of time. Other characteristics to note are that the first signal is smaller than subsequent ones, and that side lobes are visible preceding the first peak. A further complication is evident in the impulse response illustrated in FIG. 11. Two signals were received sufficiently close in time that they cannot be resolved, however in this instance the effect is seen on the leading edge of the impulse response. This substantiates why in a multipath environment a peak detection approach is not suitable, and, instead, a leading edge approach should be used. A difficulty is to detect the leading edge in the presence of noise, multipath interference and side lobes from multiple peaks.

The measured TOA is associated with the first detected signal which is often (but not always) the direct signal from transmitter to receiver. Common associations are with the peak of the impulse response (not suitable in a multipath environment) or the first detectable sample on the leading edge of the main lobe. Association of the TOA with different points on the impulse response yields different values for the TOA (e.g. the first detectable edge in the impulse response of FIG. 9 is about 9 ns prior to the peak). Provided all measurements are made consistently, offset does not matter as most applications also require calculation of or calibration for propagation delays which include the effect of this offset. While in what follows the time at which the direct signal is first detected is associated with the TOA, the method of measuring the TOA described below is equally applicable to any association between a point on the impulse response and the TOA.

Figure 12:
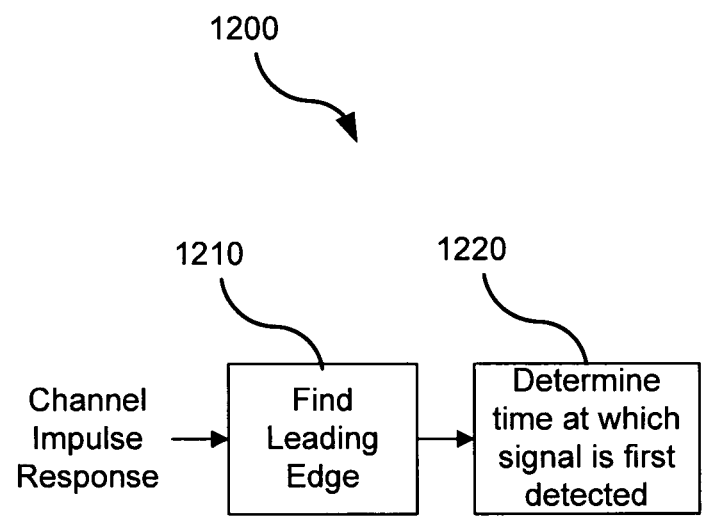
FIG. 12 is a flow diagram illustrating a method of measuring the TOA, as used in the method of FIG. 6.

FIG. 12 is a flow diagram illustrating a method 1200 of measuring the TOA, as used in step 620 of the method 600 of FIG. 6. The first step 1210 is to detect the leading edge in the channel impulse response, and the second step 1220 is to determine with high temporal resolution the time at which the direct signal is first detected.

Figure 13:
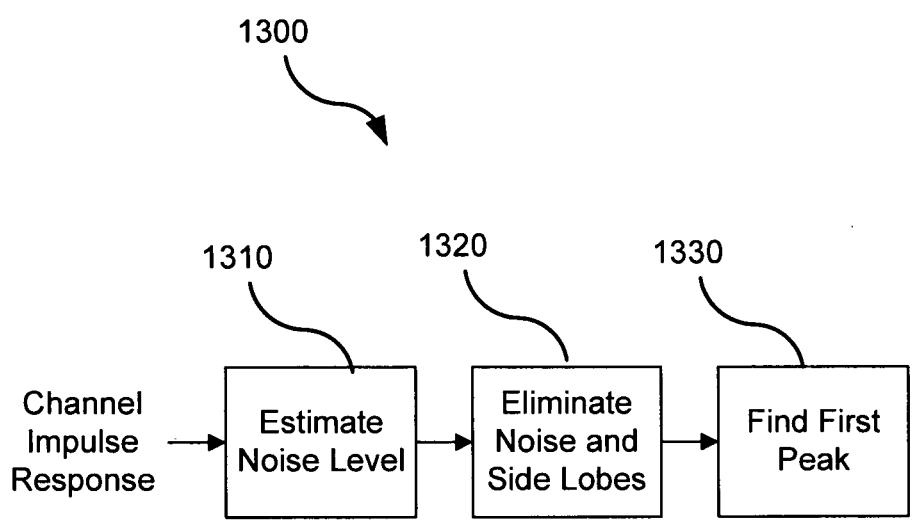
FIG. 13 is a flow diagram illustrating a method of finding the leading edge of a channel impulse response, as used in the method of FIG. 12.

FIG. 13 is a flow diagram illustrating a method 1300 of finding the leading edge of a channel impulse response, as used in step 1210 of the method 1200. The method 1300 seeks the first peak that is not noise or a side lobe. In step 1310, the noise is estimated using a set of samples at the start of the channel impulse response which are known to be prior to reception of any signal. In one implementation, the maximum value of the first 50 such samples is used.

A constant called NOISE_FACTOR is defined that is used to eliminate peaks due to noise. For a peak not to be considered noise it should exceed NOISE_FACTOR times the noise level estimated at step 1310. Two constants called PEAK_FACTOR and PEAK_TIME are defined that are used to eliminate peaks due to side lobes. If a peak has a nearby peak within a temporal range of PEAK_TIME that is at least PEAK_FACTOR times the magnitude of the first mentioned peak then the first mentioned peak is assumed to be a side lobe and discarded by step 1320.

An optional enhancement to step 1320 to further improve the robustness against side lobes is now described. Two further thresholds are defined, SIDELOBE_FACTOR1 and SIDELOBE_FACTOR2. If a candidate peak has within a temporal range of PEAK_TIME a larger subsequent peak that is at least SIDELOBE_FACTOR1 times greater in magnitude (where SIDELOBE_FACTOR1 must be less than PEAK_FACTOR) then the candidate peak is potentially a side lobe. It is known that side lobes have a periodic spacing and if there is a peak prior to the candidate peak with this separation and which is also at least SIDELOBE_FACTOR2 times the candidate peak in magnitude (where SIDELOBE_FACTOR2 is less than unity) then the candidate peak is discarded as a side lobe. Typical values for NOISE_FACTOR, PEAK_FACTOR, and PEAK_TIME are 6, 8, and 40 ns respectively. Typical values for SIDELOBE_FACTOR1 and SIDELOBE_FACTOR2 are 6 and ¼ respectively. Suitable values of these parameters depend upon the amount of noise in the system and the type of window used in the frequency domain.

The step 1330 seeks the first peak that is not eliminated as being due to noise or being a side lobe. The leading edge is a set of multiple samples prior to and including the first peak.

The final step 1220 of the method 1200 is to determine the first-arriving sample, and hence the associated TOA, of the detected signal. Two approaches are described below, the first using the leading edge samples to measure the TOA, and the second improving the accuracy by utilising statistical information relevant to the propagation environment.

Approach 1—Use Leading Edge Samples Only

In this approach, the TOA is defined as being associated with the first detectable signal sample on the main lobe. A constant called LEADING_EDGE_FACTOR is defined. The samples on the leading edge up to the peak are interpolated to the desired resolution of the TOA estimate (using some form of band limited interpolation as is well known), then the interpolated samples are traversed back in time from the peak until either the sample value is below LEADING_EDGE_FACTOR times the value of the peak, or until a local minimum is found. The time associated with this sample is returned as the TOA measurement. A typical value for LEADING_EDGE_FACTOR is 0.11.

Approach 2—Use Leading Edge Samples and Statistical Information

Figure 14:
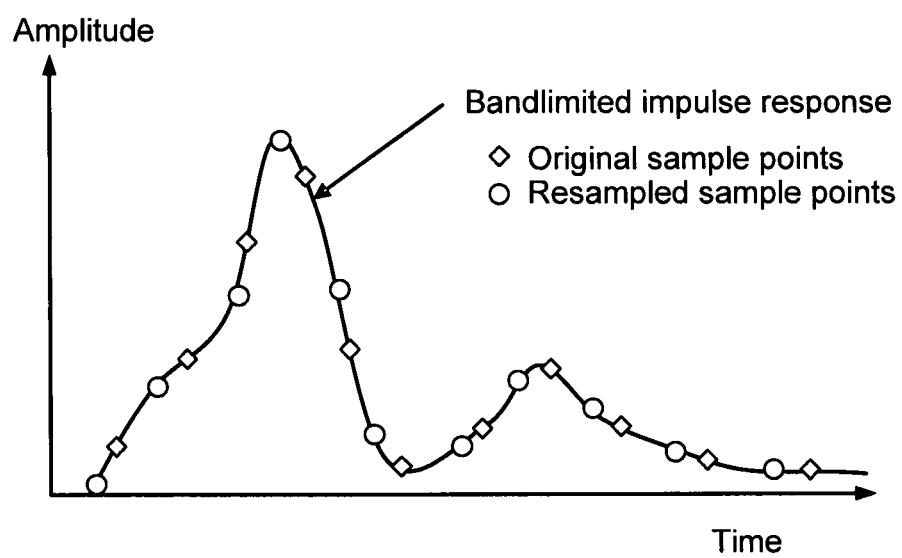
FIG. 14 illustrates the interpolation of a channel impulse response to shift the sampling points.

The second approach to step 1220 comprises the following sub-steps:

1. The impulse response is a band limited signal (limited to the bandwidth of the RF signal) sampled above the Nyquist rate. As a result, band limited interpolation can be used to resample the sampling points. The sampling points are resampled such that one of the sampling points coincides or lines up with the first significant peak in the impulse response. This is illustrated in FIG. 14.
2. A fixed number of points are taken from the resampled channel impulse response. In one implementation, three points on the leading edge are used where the bandwidth is 125 MHz and the samples are spaced by 8 ns. In another implementation 25 points are used with a spacing of 1.875 ns.

3. The set of points from the previous sub-step is compared against a database of leading edges. Each entry in the database has a TOA offset relative to the peak associated with it. The TOA from the leading edge in the database that best matches (via a least squares fit) the leading edge in question is used. The TOA in the database is a TOA relative to the first peak in the impulse response. To obtain the final TOA, the database TOA is added to the measured TOA of the first peak. The database may also contain other information about each leading edge. In particular, it may contain other possible estimates of the TOA where there are two or more possible TOAs for a single leading edge. It may also contain information about the accuracy of the TOA estimate.

The database is constructed by taking a large number of measurements in an environment similar to the one in which the system is to be used. The database is then selected as a representative sample of these measurements. Alternatively, the properties of a well-known channel model (for example the Saleh-Valenzuela model) can be extracted from the measurements, and the channel model used to simulate a large number of measurements. This approach reduces the number of measurements that need to be taken. The number of entries in the database is not crucial, but in one implementation it can contain 4000 entries.

The resampling process described in sub-step (2) is desirable in order to provide a standardised shape for the leading edge, which limits the number of entries required in the database. In dense multipath environments, the mean TOA errors arising from this approach are between 50% and 75% of the errors resulting from other methods.

Some possible modifications or variations to Approach 2 are as follows:

Interpolating between several TOAs in the database, based on two or more close matches in the database to the impulse response being examined.

Changing the number of points used to specify the shape of the impulse response.

Using points on the trailing edge as well as points on the leading edge.

Different schemes for reducing the number of elements in the database, e.g. k-means.

More efficient search and storage of the database using principal components analysis (PCA), support vector machine (SVM) or other technique to reduce the leading edge samples to a lower dimensional feature vector.

Intelligent searching of the database. Rather than just doing a least squares fit, indexing the database (e.g. according to the magnitude of the first point on the leading edge) and using the index of the leading edge under consideration as a starting point in the search of the database. In one implementation the time required to search the database is reduced by creating a hierarchical index. Similar entries in the database are grouped together, and the leading edge under consideration is compared against one edge in each group. It is then compared against all the leading edges in the group which best matched. The entries in each group can be likewise be searched by creating subgroups, and finding the best subgroup be comparing against a single entry in each subgroup.

The foregoing describes only some embodiments of the present invention, and modifications and/or changes can be made thereto without departing from the scope and spirit of the invention, the embodiments being illustrative and not restrictive.

The invention claimed is:

1. A method of measuring time of arrival of a signal transmitted from a transmitter to a receiver over a channel, said method comprising:
   modulating a plurality of narrowband signal portions onto different carrier frequencies;
   transmitting, by said transmitter, each said modulated narrowband signal portion to said receiver, each of said modulated narrowband signal portions being transmitted separately over time and over a respective one of said different carrier frequencies;
   receiving, by said receiver, the narrowband signal portions over said different carrier frequencies;
   estimating an impulse response of the channel by combining the received narrowband signal portions; and
   measuring the time of arrival using the estimated channel impulse response.

2. A method according to claim 1, wherein each said narrowband signal portion has substantially equal power at all frequencies within the band of the narrowband signal portion, and a limited peak to average power ratio in the time domain.

3. A method according to claim 1, wherein the frequency responses of at least two of said modulated narrowband signal portions overlap in the frequency domain.

4. A method according to claim 1, wherein said estimating comprises:
   determining a frequency response for each said received narrowband signal portion;
   applying a correction to the phase of each said frequency response;
   combining the corrected channel frequency responses into a wideband frequency response; and
   transforming the wideband frequency response into the channel impulse response.

5. The method according to claim 4, wherein the correction is applied such that the wideband frequency response is continuous in phase.

6. The method according to claim 4, wherein the correction is applied such that overlapping portions of adjacent frequency responses have matching phases.

7. The method according to claim 6, wherein the applying comprises:
   computing, for each frequency response, a complex constant that minimises the sum of the squared error between the overlapping values of the frequency response and an adjacent frequency response; and
   multiplying the frequency response values by the complex constant.

8. The method according to claim 4, wherein the correction is further applied to the magnitude of each said frequency response.

9. The method according to claim 4, wherein said determining comprises compensating each frequency response for the distortive effect of the transmitter and the receiver.

10. The method according to claim 4, wherein the transforming comprises:
    applying an inverse Fourier transform to the wideband frequency response to form the channel impulse response.

11. A method of measuring a time of arrival of a signal transmitted from a transmitter to a receiver, said method comprising:
    estimating a noise level in an impulse response of a channel between said transmitter and said receiver;

finding a first peak in the channel impulse response that is not noise or a side lobe of a subsequent peak, using said estimated noise level; and measuring the time of arrival using said first peak;

wherein the measuring comprises:

extracting a predetermined number of samples on a leading edge of said first peak;

looking up a database of stored time of arrival offset values using said extracted leading edge samples; and obtaining the time of arrival from said database lookup.

12. The method according to claim 11, further comprising, before said extracting, resampling said channel impulse response such that one of the sampling points coincides with the location of said first peak.

13. The method according to claim 11, wherein the database is hierarchical.

14. The method according to claim 11, further comprising extracting a lower dimensional feature from the extracted leading edge samples before said database lookup.

15. The method according to claim 11, wherein the database is constructed using channel impulse responses generated by a channel model, wherein the parameters of the model are derived from measurements.

16. The method according to claim 11, wherein the database contains additional information about the time of arrival including:

one or more further estimates of times of arrival for each impulse response;

the likelihood of each time of arrival estimate; and the uncertainty in each time of arrival estimate.

17. The method according to claim 1, wherein the measuring comprises:

estimating a noise level in said impulse response;

finding a first peak in said impulse response that is not noise or a side lobe of a subsequent peak, using said estimated noise level; and measuring the time of arrival using said first peak.

18. A method of measuring time of arrival of a signal transmitted from a transmitter to a receiver over a channel, said method comprising:

receiving, by said receiver, a plurality of narrowband signal portions over different carrier frequencies, each narrowband signal portion having been modulated onto a respective one of said different carrier frequencies, each of said modulated narrowband signal portions having been transmitted separately over time by said transmitter;

estimating an impulse response of the channel by combining the received narrowband signal portions; and measuring the time of arrival using the estimated channel impulse response.

19. A system adapted to measure time of arrival, the system comprising:

a transmitter adapted to:

modulate a plurality of narrowband signal portions onto different carrier frequencies; and transmit each said modulated signal portion to said receiver over a channel, each of said modulated narrowband signal portions being transmitted separately over time and over a respective one of said different carrier frequencies; and a receiver adapted to:

receive the narrowband signal portions over said different carrier frequencies;

estimate an impulse response of the channel by combining the received narrowband signal portions; and measure the time of arrival using the estimated channel impulse response.

20. A receiver adapted to measure time of arrival of a signal transmitted from a transmitter to a receiver over a channel, the receiver being adapted to:

receive a plurality of narrowband signal portions over different carrier frequencies, each narrowband signal portion having been modulated onto a respective one of said different carrier frequencies, each of said modulated narrowband signal portions having been transmitted separately over time by said transmitter;

estimate an impulse response of the channel by combining the received narrowband signal portions; and measure the time of arrival using the estimated channel impulse response.

* * * * *